(12) United States Patent
Bissen et al.

(10) Patent No.: US 10,737,925 B2
(45) Date of Patent: Aug. 11, 2020

(54) APPARATUS AND METHOD FOR MINERALIZING A FLUID

(71) Applicants: Monique Bissen, Pforzheim (DE); Josef Schucker, Ronco Sopra Ascona (CH); Christian Schrotshamer, Pforzheim (DE); Waldemar Dan, Pforzheim (DE)

(72) Inventors: Monique Bissen, Pforzheim (DE); Josef Schucker, Ronco Sopra Ascona (CH); Christian Schrotshamer, Pforzheim (DE); Waldemar Dan, Pforzheim (DE)

(73) Assignee: RIPRUP Company S.A., St. Peter Port (GG)

( * ) Notice: Subject to any disclaimer, the term of this patent is extended or adjusted under 35 U.S.C. 154(b) by 0 days.

(21) Appl. No.: 16/198,997

(22) Filed: Nov. 23, 2018

(65) Prior Publication Data

US 2019/0152757 A1 May 23, 2019

(30) Foreign Application Priority Data

Nov. 23, 2017 (EP) ..................................... 17203425

(51) Int. Cl.
*B67D 1/00* (2006.01)
*B67D 1/07* (2006.01)
(Continued)

(52) U.S. Cl.
CPC .............. *B67D 1/0034* (2013.01); *A23L 2/52* (2013.01); *B67D 1/004* (2013.01); *B67D 1/07* (2013.01);
(Continued)

(58) Field of Classification Search
CPC ........ B67D 1/0034; B67D 1/004; B67D 1/07; B67D 2001/075; B67D 2210/0001;
(Continued)

(56) References Cited

U.S. PATENT DOCUMENTS 6,505,758 B2\* 1/2003 Black ................... B67D 1/0034
222/146.6
7,147,131 B2\* 12/2006 Sher ........................ A47J 31/41
222/1
(Continued)

FOREIGN PATENT DOCUMENTS

DE 20 2010 000 286 U1 7/2010
FR 3 012 123 10/2013

OTHER PUBLICATIONS

EPO: "European Search Report"; EP Application No. EP 17 20 3425; May 14, 2018.

*Primary Examiner* — Frederick C Nicolas
(74) *Attorney, Agent, or Firm* — Bryan W. Bockhop; Bockhop Intellectual Property Law, LLC

(57) ABSTRACT

A beverage supplementation device for a beverage dispenser, adapted to supplement a beverage flowing from a beverage source to a beverage sink with a plurality of supplementation fluids includes a plurality of beverage conduits, wherein each beverage conduit includes a beverage inlet that is adapted to be coupled to the same beverage source supplying beverage to be supplemented, and wherein each beverage conduit includes an outlet; and at least two supplementation conduits, wherein each supplementation conduit has a supplementation inlet adapted to be coupled to a supplementation source providing at least one supplementation fluid, wherein each supplementation conduit is coupled with a different supplementation source and wherein each supplementation conduit includes an outlet; wherein the outlet of each supplementation conduit is con-
(Continued)

nected to a different beverage conduit; and wherein the outlets of the beverage conduits are coupled with the same beverage sink.

13 Claims, 3 Drawing Sheets

(51) Int. Cl.
*A23L 2/52* (2006.01)
*C02F 1/68* (2006.01)
*C02F 1/44* (2006.01)

(52) U.S. Cl.
CPC ............... *C02F 1/68* (2013.01); *C02F 1/685* (2013.01); *A23V 2002/00* (2013.01); *B67D 2001/075* (2013.01); *B67D 2210/0001* (2013.01); *B67D 2210/0006* (2013.01); *B67D 2210/00013* (2013.01); *C02F 1/441* (2013.01); *C02F 1/686* (2013.01); *C02F 2307/10* (2013.01)

(58) Field of Classification Search
CPC .. B67D 2210/00013; B67D 2210/0006; C02F 1/68; C02F 1/441; C02F 1/686; C02F 2307/10; C92F 1/685; A23L 2/52; A23V 2002/00

See application file for complete search history.

(56) References Cited

U.S. PATENT DOCUMENTS

| | | | | |
|---|---|---|---|---|
| 7,757,896 B2* | 7/2010 | Carpenter | ............ | B67D 1/0051 |
| | | | | 222/129.4 |
| 7,913,879 B2* | 3/2011 | Carpenter | ............ | B67D 1/0085 |
| | | | | 222/1 |
| 8,069,883 B2* | 12/2011 | Shiraishi | ............ | B67D 1/0027 |
| | | | | 141/351 |
| 8,162,176 B2* | 4/2012 | Rudick | ............ | B67D 1/0888 |
| | | | | 222/1 |
| 8,870,025 B2* | 10/2014 | Reddy | ............ | F04B 43/1261 |
| | | | | 222/1 |
| 8,893,927 B2* | 11/2014 | Olson | ............ | B01F 5/0496 |
| | | | | 222/162 |
| 9,046,300 B2* | 6/2015 | Chase | ............ | F25D 23/126 |
| 2006/0021919 A1 | 2/2006 | Olson et al. | | |
| 2017/0088410 A1 | 3/2017 | Wing et al. | | |

* cited by examiner

APPARATUS AND METHOD FOR MINERALIZING A FLUID

CROSS-REFERENCE TO RELATED APPLICATION(S)

This application claims the benefit of EP Patent Application No. EP17203425.8, filed Nov. 23, 2017, the entirety of which is hereby incorporated herein by reference.

BACKGROUND OF THE INVENTION

1. Field of the Invention

The present invention relates to a beverage supplementation device and a beverage dispenser having such beverage supplementation device. The beverage supplementation device may be a mineralization device that adds minerals to filtered and demineralized water in a beverage dispenser dispensing synthetic mineral water.

2. Description of the Related Art

In a water dispenser water fed by a source, such as a tap or tank, is demineralized, for example by a reverse osmosis filter of the water dispenser.

Demineralized water cannot be consumed by humans. Therefore, there is a need for a device supplementing demineralized water with minerals, flavor, or the like. If minerals, flavoring fluids or the like are added in a high concentration to a beverage, undesired chemical reactions between the minerals, flavoring fluids or the like may occur.

SUMMARY OF THE INVENTION

It is an object of the present invention to provide a beverage supplementation device avoiding a chemical reaction of the beverage supplementation fluids supplemented to a beverage.

The object of the present invention is achieved by a beverage supplementation method according to claim 1, a beverage dispenser according to claim 3 or 11 and a beverage supplementation device according to claim 5. The depending claims relate to preferred embodiments.

A beverage supplementation device according to a first embodiment according to the present invention is adapted to supplement a beverage flowing from a beverage source to a beverage sink with a plurality of supplementation fluids and comprises a plurality of beverage conduits and at least two supplementation conduits. Each beverage conduit comprises a beverage inlet that is adapted to be coupled to the same beverage source supplying beverage to be supplemented. Each beverage conduit comprises an outlet. Each supplementation conduit has an inlet adapted to be coupled to a supplementation source providing at least one supplementation fluid. Each supplementation conduit is coupled with a different supplementation source by its inlet. Each supplementation conduit comprises an outlet. The outlet of each supplementation circuit is connected to a different beverage conduit. The outlets of the beverage conduits are coupled with the same beverage sink.

The beverage source may be a filter, an activated coal filter, a reverse osmosis filter, a tap, a tank or the like. The sink may be an outlet of the beverage supplementation device, a tube coupled to the plurality of beverage conduits, a vessel, a nozzle, a disinfection device or the like.

According to the present invention beverage flowing from a beverage source is split into at least two beverage conduits. Beverage supplements that can react chemically are supplied to different beverage conduits. Thereby, the beverage supplement is diluted in each of the beverage conduits. As soon as the fluids of the plurality of beverage conduits are joined in an outlet of the beverage supplementation device, a tube, a nozzle or any other device of a beverage dispenser, the supplementation fluids are diluted such that the beverage supplements do not react chemically. Thus, the present invention ensures that a user receives beverage with the appropriate mixture of beverage supplements.

In one embodiment, the beverage is water and the supplementation fluid comprises minerals.

In the context of the present invention the supplementation fluid may be a liquid. In another embodiment the supplementation fluid may be a gas transporting beverage supplement particles.

The beverage provided by the source may be demineralized water, such as water filtered by a reverse osmosis filter.

In one embodiment the beverage supplementation device may comprise a plurality of supplementation conduits. The plurality of outlets of a first plurality of supplementation conduits are coupled to the same beverage conduit. The outlets of a second plurality of supplementation conduits are coupled with different beverage conduits. The first plurality of supplementation conduits may transport supplementation fluids that do not react chemically. The second plurality of supplementation conduits transport supplementation liquids that react chemically. Since the supplementation liquids that can react, when combined in a high concentration, are delivered to different beverage conduits, each supplementation fluid is diluted. If the beverage supplements of the supplementation liquids are combined in a diluted form, they do not react chemically. Supplementation liquids that do not react in a high concentration can be supplied in the same beverage conduit in order to reduce the necessary amount of beverage conduits to reduce overall effort.

To at least one beverage conduit a plurality of supplementation outlets of different supplementation conduits are coupled spaced apart from each other to a single beverage conduit. Since the supplementation outlets of the plurality of supplementation conduits are connected spaced apart from each other to a single beverage conduit the supplementation fluids are diluted at least partly before they are mixed.

In one embodiment the beverage inlets of the plurality of beverage conduits are coupled to a single inlet of the beverage supplementation device. In this embodiment a single conduit is connected to the water source and the beverage supplementation device. The flow of beverage from the beverage source through the single inlet of the beverage supplementation device is divided into the plurality of beverage conduits.

In one embodiment the beverage outlets of the plurality of beverage conduits are coupled to a single outlet of the beverage supplementation device. In this embodiment, the beverage flowing in the plurality of beverage conduits is joined in a single flow through the single outlet of the beverage supplementation device.

The invention also discloses a beverage dispenser and/or beverage machine comprising the beverage supplementation device described above. Preferably, the beverage dispenser is a water dispenser, coffee machine or the like.

Generally, in a water dispenser water fed by a source, such as a tap or tank, is demineralized, for example by reverse osmosis filter. Thereafter, minerals are supplemented to the demineralized water based on the preferences of a user and/or based on physical considerations, such as dehydration of a user, lack of minerals or the like. The minerals may be stored in mineralization fluid vessels and may be fed into water passing from the filter to a nozzle dispensing the synthetic mineral water to a user vessel, such as a glass.

In order to provide a user a broad range of possible types of mineral water, a controller may control dosing devices (pumps) such that different quantities of mineralization fluids stored in a plurality of mineralization fluid vessels are fed into the conduit, in which water flows from the filter to the nozzle. However, the minerals are highly concentrated when fed into a single conduit such that they react chemically resulting in that the user is provided with a not appropriate mixture of minerals in the water. The present invention avoids the drawbacks of the prior art by using multiple beverage conduits in which beverage supplements are fed.

In one embodiment of the beverage dispenser the beverage source is a water filtration device, a tank and/or a tap. The beverage sink may be a tube, a vessel, a nozzle and/or a disinfection device. The inlet of each supplementation conduit is coupled to a different supplementation source. The supplementation source may be a mineralization fluid vessel, a flavoring agent vessel and/or a nutrition supplement vessel.

In one embodiment the beverage dispenser may comprise a plurality of dosing devices, wherein the outlet of each dosing device is connected to the inlet of a supplementation conduit and the inlet of each dosing device is connected to a different supplementation source. The dosing devices may be micro dosing devices, micrometering pumps, piezo pumps, membrane pumps or the like.

In one embodiment the beverage dispenser comprises a controller adapted to control the plurality of dosing devices. The controller controls a first dosing device and a second dosing device. The outlet of the first dosing device is coupled to an inlet of a first supplementation circuit, and the outlet of the second dosing device is coupled to the inlet of a second supplementation circuit. The outlet of the second supplementation circuit is located downstream of the outlet of the first supplementation circuit with the same beverage conduit. The controller controls the first dosing device and the second dosing device such that the supplementation fluid supplied by the first dosing device does not react with the supplementation fluid supplied by the second dosing device.

In other words, the controller controls the plurality of dosing devices such that the supplementation fluids are fed into the beverage flowing in the beverage conduit in sequential order. Thereby, it can be assured that the beverage fluids are not mixed as long as they comprise a high concentration.

The controller is adapted to stop the second dosing device before the supplementation fluid fed by the first dosing device by the outlet of the first supplementation conduit in the beverage conduit is transported by the flow of beverage in the beverage conduit to the outlet of the second supplementation conduit. In operation, the controller may activate the first and second dosing device concurrently, such that the first and second dosing device feed supplementation fluid by the outlet of the first supplementation conduit and the outlet of the second supplementation conduit into the beverage conduit in which a beverage flows. The flow of beverage in the beverage conduit transports the supplementation fluid from the outlet of the first supplementation conduit to the outlet of the second supplementation conduit. Before the supplementation fluid fed by the first dosing device reaches the outlet of the second supplementation conduit, the controller stops the second dosing device to avoid that the two supplementation fluids are mixed in high concentration.

The invention also discloses a method of supplementing a beverage with a plurality of supplementation fluids in a beverage dispenser. The beverage dispenser may be configured as described above. Particularly, the beverage dispenser comprises at least one beverage conduit, a first dosing device and a second dosing device. The at least one beverage conduit comprises a beverage inlet that is adapted to be coupled to a beverage source supplying beverage to be supplemented. Each beverage conduit comprises a beverage outlet coupled to a beverage sink. The outlet of the first dosing device is connected to an inlet of a first supplementation circuit and the inlet of the first dosing device is connected to a first supplementation source. The outlet of the second dosing device is connected to an inlet of a second supplementation conduit and the inlet of the second dosing device is connected to a second supplementation source. The outlet of the second supplementation conduit is located downstream of the outlet of the first supplementation conduit with the same beverage conduit. The method according to the present invention comprises the step of controlling the first dosing device and the second dosing device such that the supplementation fluid supplied by the first dosing device does not react with the supplementation fluid supplied by the second dosing device.

In one embodiment the method according to the present invention comprises the step of stopping the second dosing device before the supplementation fluid fed by the first dosing device into the beverage conduit is transported by the flow of the beverage in the beverage conduit to the outlet of the second supplementation circuit.

According to one embodiment of the present invention the beverage supplementation device comprises a plurality of beverage conduits in which a beverage flows from a beverage source to a beverage sink. A first plurality of supplementation conduits feeds supplementation fluid in a parallel manner into the beverage conduits in order to avoid a chemical reaction of the supplementation fluids. It is also possible to connect a plurality of supplementation conduits to a single beverage conduit and to control dosing devices as such that the supplementation fluids are dosed sequentially into the beverage flowing in the beverage conduit to which a plurality of supplementation conduits are connected spaced apart from each other.

The outlet of at least one supplementation conduit is arranged vertically under the beverage conduit. In another embodiment the outlet of at least one supplementation conduit and the dosing device are arranged vertically under the beverage conduit. In still another embodiment the outlet of at least one supplementation conduit, the dosing device and the supplementation source are arranged vertically under the beverage conduit. This prevents supplementation fluid (mineralization fluid) from diffusing from the supplementation conduit into the beverage conduit. Thereby, Fall-out of minerals and other undesired chemical reactions may be avoided.

Thereby, chemical reaction between the supplementation fluids can be avoided. Two outlets of supplementation conduits feeding supplementation fluids not-reacting with each other may comprise a first distance, and two outlets of supplementation conduits feeding supplementation fluids reacting with each other comprise a second distance, wherein the second distance is larger than the first distance. In this embodiment of the invention, the first outlet coupled to a first supplementation conduit (mineralization conduit) and second outlet coupled to a second supplementation conduit (mineralization conduit) are space apart such that no diffusion of supplementation fluids (mineralization fluids) from a first outlet to the second outlet during stagnation. Thereby, fall out or other undesired chemical reaction may be avoided.

The invention discloses a method of supplementing a beverage with a plurality of supplementation fluids in a beverage dispenser according to a second embodiment of the invention. The beverage dispenser comprises at least one beverage conduit including a beverage inlet adapted to be coupled to a beverage source supplying beverage to be supplemented and a beverage outlet coupled to a beverage sink. The beverage source and the beverage outlet may be embodied as described above in the context of the first embodiment. The beverage dispenser further comprises a first dosing device, wherein an outlet of the first dosing devices is connected to an inlet of a first supplementation conduit and an inlet of the first dosing device is connected to a first supplementation source comprising a first supplementation component. The beverage dispenser further comprises a second dosing device, wherein an outlet of the second dosing device is connected to an inlet of a second supplementation conduit and an inlet of the second dosing device is connected to a second supplementation source comprising a second supplementation component. The first and second dosing device, the first and second supplementation conduit as well as the first and second supplementation source may be embodied as described above. The first and second supplementation component may be minerals in a fluid, flavoring agents or the like.

The outlet of the second supplementation conduit is located downstream of the outlet of the first supplementation conduit of the same beverage conduit.

The method comprises the step of controlling the first dosing device and the second dosing device such that the first supplementation component supplied by the first dosing device does not react with the second supplementation component, supplied by the second dosing device. Thereby, fall out and/or undesired chemical reaction between the first and second supplementation component due to the high concentration after feeding the supplementation components into the beverage within the beverage conduits are prevented.

The method further comprises the step of stopping feeding by the second dosing device of the second supplementation component before the first supplementation component fed by the first dosing device into the beverage conduit is transported by the flow of beverage in the beverage conduit to the outlet of the second supplementation conduit.

According to the second embodiment of the present invention a beverage dispenser is disclosed. The beverage dispenser according to the second embodiment comprises a controller adapted to control a first dosing device and a second dosing device. An outlet of the first dosing device is coupled to an inlet of a first supplementation conduit. An outlet of the second dosing device is coupled to an inlet of a second supplementation conduit. The outlet of the second supplementation conduit is located downstream of the outlet of the first supplementation conduit of a beverage conduit. A beverage flows in the beverage conduit from a beverage source to a beverage sink. The controller controls the first dosing device and the second dosing device such that a first supplementation component supplied by the first dosing device does not react with a second supplementation component supplied by the second dosing device. As mentioned above, thereby fall out or an undesired chemical reaction between the first supplementation component or the second supplementation component may be prevented. The first and second dosing device, the first and second supplementation conduit as well as the first and second supplementation component may be embodied as described above with reference to the first embodiment and the method according to the second embodiment.

The controller of the beverage dispenser may be adapted to stop feeding the second supplementation component by the second dosing device before the first supplementation component fed by the first dosing device through the outlet of the first supplementation conduit into the beverage conduit is transported by the flow of the beverage in the beverage conduit to the outlet of the second supplementation conduit.

The second embodiment of the beverage dispenser may be configured as the first embodiment described above.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

The invention is now described in further detail with reference to an exemplary and not limiting embodiment with reference to the figure, wherein.

DETAILED DESCRIPTION OF THE INVENTION

Figure 1:
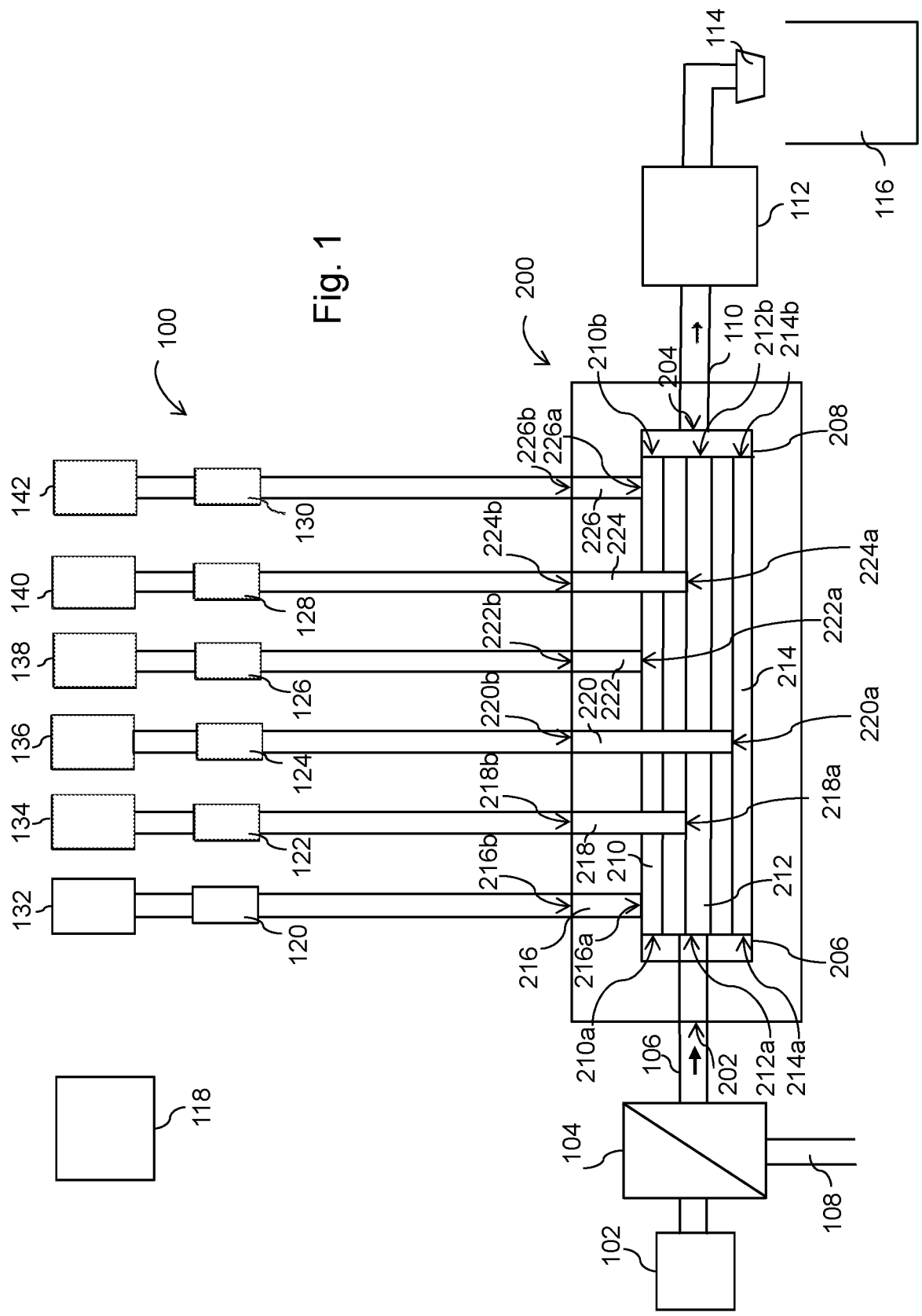
FIG. 1 shows a schematic diagram of a water dispenser having the inventive beverage supplementation device according to a first embodiment.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The invention is described with reference to a water dispenser 100 embodying the claimed beverage dispenser having a mineralization device 200 embodying the claimed beverage supplementation device.

The water dispenser 100 comprises a water source 102 such as a tank or tap. The water source 102 is connected to a reverse osmosis filter 104. Filtered water exits the reverse osmosis filter 104 by the conduit 106. The concentrate exits the reverse osmosis filter 104 by the conduit 108 and is disposed.

In the conduit 106 demineralized water flows to an inlet 202 of a mineralization device 200. From the inlet 202 the demineralized water flows to an inlet manifold 206. A first beverage conduit 210, a second beverage conduit 212 and a third beverage conduit 214 are connected to the inlet manifold 206. Water flows from the inlet manifold 206 through the first beverage conduit 210, the second beverage conduit 212 and the third beverage conduit 214. After the water has passed the first beverage conduit 210, the second beverage conduit 212 and the third beverage conduit 214 the water flows to the outlet manifold 208, from which the water flows through the outlet 204 of the water mineralization device 200. The inlet 210a of the first beverage conduit 210, the inlet 212a of the second beverage conduit 212 and the inlet 214a of the third beverage conduit 214 are connected to the inlet manifold 206. The outlet 210b of the first beverage conduit 210, the outlet of the second beverage conduit 212b and the outlet 214b off the third beverage conduit 214 are connected to the outlet manifold 208.

The mineralization device 200 and its components may be made of stainless steel, such as V4A-steel, and steel or other materials suitable for use in food.

The water flows from the outlet 204 of the mineralization device 200 to a disinfecting device 112 and to a nozzle 114, where the water is outputted into a vessel 116 of a user.

The water dispenser 100 comprises a plurality of mineralization vessels 132, 134, 136, 138, 140, 142 storing different mineralization fluids. The water dispenser 100 further comprises a plurality of dosing devices 120, 122, 124, 126, 128, 130, such as pumps. Particularly, the first mineralization vessel 132 is connected by the first dosing device 120 to the inlet 216b of a first supplementation conduit 216. A second mineralization vessel 134 is connected by a second dosing device 122 to the inlet 218b of a second supplementation conduit 218. A third mineralization vessel 132 is connected by a second dosing device 124 to an inlet 220b of a third supplementation conduit 220. A fourth mineralization vessel 132 is connected by a fourth dosing device 126 to the inlet 222b of a fourth supplementation conduit 222. A fifth mineralization vessel 114 is connected by a fifth dosing device 128 to the inlet 224b of a fifth supplementation conduit. A sixth mineralization vessel 142 is connected by a sixth dosing device 130 to the inlet 226b of the sixth supplementation conduit 226.

An outlet 216a of the first supplementation conduit 216, an outlet 224a of the fourth supplementation conduit 224 and an outlet 226a of the sixth supplementation conduit 226 are connected spaced apart from each other to the first beverage conduit 210. An outlet 218a of the second supplementation conduit 218 and an outlet 224a of the fifth supplementation conduit 224 are connected spaced apart from each other to the second beverage conduit 212. An outlet 220a of the third supplementation conduit 220 is connected to the third beverage conduit 214.

In the exemplary embodiment shown in FIG. 1 the mineralization fluid stored in the third mineralization bottle 136 may react chemically with the second mineralization fluid stored in the second mineralization bottle 134 and/or react with the first mineralization fluid stored in the first mineralization bottle 132 and/or with the fourth mineralization fluid stored in the fourth mineralization bottle 138 and/or with the fifth mineralization fluid stored in the fifth mineralization vessel 140 and/or with the sixth mineralization fluid stored in the sixth mineralization vessel 142. Further, the first mineralization fluid may react with the second mineralization fluid and/or the fifth mineralization fluid. The fourth mineralization fluid may react with the second mineralization fluid and/or the fifth mineralization fluid. The sixth mineralization fluid may react with the fifth mineralization fluid.

Therefore, the first mineralization fluid is fed by the first supplementation conduit 216, the fourth mineralization fluid is fed by the fourth supplementation conduit 222 and the sixth mineralization fluid is fed by the sixth supplementation conduit 226 into the first beverage conduit 210, and the second mineralization fluid is fed by the second supplementation conduit 218 and the fifth mineralization fluid is fed by the fifth supplementation conduit 224 into the second beverage conduit 212. Thereby, the first mineralization fluid, the second mineralization fluid, the fourth mineralization fluid, the fifth mineralization fluid and/or the sixth mineralization fluid are diluted in the first beverage conduit 210 and the second beverage conduit 212 such that they do not react in the output manifold 208. Finally, the third mineralization fluid is fed by the third supplementation conduit 220 to the third beverage conduit 214 to avoid that the third mineralization fluid reacts with the first, second, fourth, fifth and/or the sixth mineralization fluid.

The present invention allows that mineralization fluids (supplementation fluids) are fed in parallel into a plurality of water streams for diluting the mineralization fluids before they are rejoined to a single water stream that is supplied as beverage to a user.

The present invention also allows to feed mineralization fluid serially into a water stream. Particularly, a controller 118 can control operation of the dosing devices 120-130. Particularly, the controller 116 can control the first dosing device 120, the fourth dosing device 126 and the sixth dosing device 113 such that when minerals are to be fed by the first dosing device 120, the fourth dosing device 126 and the sixth dosing device 130 to the first beverage conduit 210 the first dosing device 120, the fourth dosing device 126 and the sixth dosing device 130 are activated, as soon as a user wishes to be supplied with mineralized water. If the first mineralization fluid, the fourth mineralization fluid and/or the sixth mineralization fluid react, the controller can stop the sixth dosing device 130 before the fourth mineralization fluid supplied by a fourth dosing device 126 reaches the outlet 266a of the sixth supplementation conduit 226. Further, the controller 118 can stop the fourth dosing device 126 before the first mineralization fluid supplied by the first mineralization device 120 reaches the outlet 226a of the fourth supplementation conduit 226. Further, the second dosing device 122 can supply the second mineralization fluid and the fifth dosing device 128 can supply the fifth mineralization fluid to the second beverage conduit 212, as soon as a user requests water mineralized by the second and fifth mineralization fluid. The controller stops the fifth dosing device 128 before the second mineralization fluid fed of by the second dosing device 122 reaches the outlet 224a of the fifth supplementation conduit 224 by the flow of the water in the second beverage conduit 212. Thereby, minerals are fed serially into the beverage conduits in order to avoid a chemical reaction between the different mineralization fluids.

Figure 2:
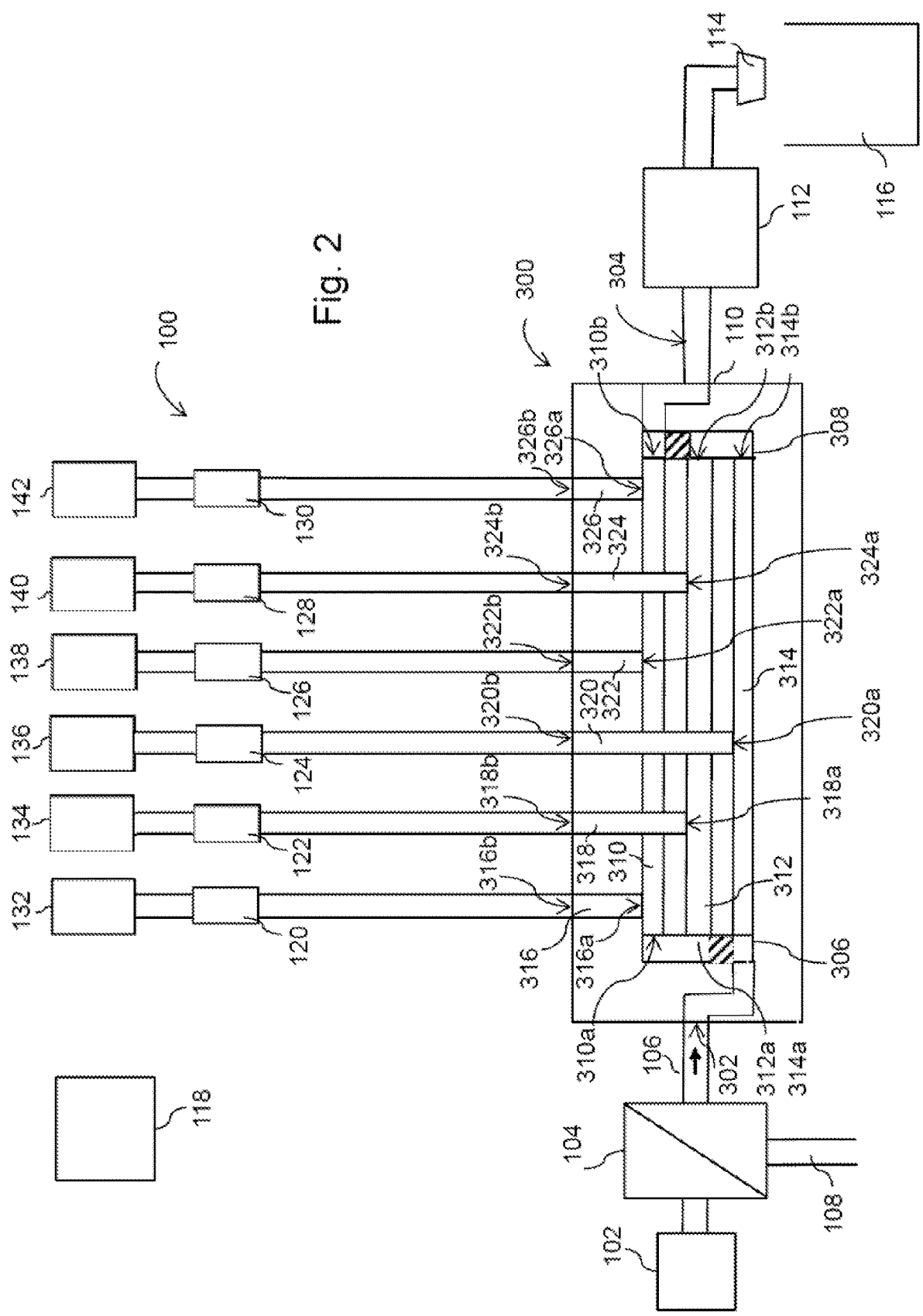
FIG. 2 shows a schematic diagram of a water dispenser having the inventive beverage supplementation device according to the second embodiment.

With reference to FIG. 2 a second embodiment of the beverage dispenser 100' according to the present invention is described. In the conduit 106 demineralized water flows to an inlet 302 of the mineralization device 300. From the inlet 302 the demineralized water flows to a first manifold 306. A first beverage conduit 314, is connected to the inlet manifold 306. Water flows from the first manifold 306 through the first beverage conduit 314, the second manifold 308, the second beverage conduit 312, the first manifold 306 and the third beverage conduit 310. After the water has passed the third beverage conduit 310 the water flows to the second manifold 308, from which the water flows through the outlet 304 of the water mineralization device 300.

Particularly, the water flows from the conduit 106 into an inlet of the first manifold 306. From the inlet of the first manifold 206 the water flows into the first beverage conduit 314. The water exiting from the second beverage conduit 312 flows through a passage in the first manifold 306 to the third beverage conduit 310. The second manifold 308 comprises a passage from which water flows from the first beverage conduit 314 to the second beverage conduit 312.

The second manifold 308 comprises an opening for which beverage flows from the third beverage conduit 310 to the outlet 304 of the mineralization device 300.

The mineralization device 300 and its components may be made of stainless steel, such as V4A-steel, and steel or other materials suitable for use in food technology.

The water flows from the outlet 304 of the mineralization device 300 through a conduit 110 to a disinfecting device 112 and to a nozzle 114, where the water is output into a vessel 116 of a user.

The water dispenser 100' comprises a plurality of mineralization vessels 132, 134, 136, 138, 140, 142 storing different mineralization fluids. The water dispenser 100' further comprises a plurality of dosing devices 120, 122, 124, 126, 128, 130, such as pumps. Particularly, the first mineralization vessel 132 is connected by the first dosing device 120 to the inlet 116b of a first supplementation conduit 316. A second mineralization vessel 134 is connected by a second dosing device 122 to the inlet 318b of a second supplementation conduit 318. A third mineralization vessel 132 is connected by a second dosing device 124 to an inlet 320b of a third supplementation conduit 320. A fourth mineralization vessel 132 is connected by a fourth dosing device 126 to the inlet 322b of a fourth supplementation conduit 322. A fifth mineralization vessel 114 is connected by a fifth dosing device 128 to the inlet 324b of a fifth supplementation conduit. A sixth mineralization vessel 142 is connected by a sixth dosing device 130 to the inlet 326b of the sixth supplementation conduit 326.

An outlet 316a of the first supplementation conduit 316, an outlet 324a of the fourth supplementation conduit 324 and an outlet 326a of the sixth supplementation conduit 326 are connected spaced apart from each other to the third beverage conduit 310. An outlet 318a of the second supplementation conduit 318 and an outlet 324a of the fifth supplementation conduit 324 are connected spaced apart from each other to the second beverage conduit 312. An outlet 320a of the third supplementation conduit 320 is connected to the third beverage conduit 314.

In the exemplary embodiment shown in FIG. 1 the mineralization fluid stored in the third mineralization bottle 136 may react chemically with the second mineralization fluid stored in the second mineralization bottle 134 and/or react with the first mineralization fluid stored in the first mineralization bottle 132 and/or with the fourth mineralization fluid stored in the fourth mineralization bottle 138 and/or with the fifth mineralization fluid stored in the fifth mineralization vessel 140 and/or with the sixth mineralization fluid stored in the sixth mineralization vessel 142. Further, the first mineralization fluid may react with the second mineralization fluid and/or the fifth mineralization fluid. The fourth mineralization fluid may react with the second mineralization fluid and/or the fifth mineralization fluid. The sixth mineralization fluid may react with the fifth mineralization fluid.

Therefore, the first mineralization fluid is fed by the first supplementation conduit 316, the fourth mineralization fluid is fed by the fourth supplementation conduit 322 and the sixth mineralization fluid is fed by the sixth supplementation conduit 326 into the third beverage conduit 314, and the second mineralization fluid is fed by the second supplementation conduit 318 and the fifth mineralization fluid is fed by the fifth supplementation conduit 324 into the second beverage conduit 312. Thereby, the first mineralization fluid, the second mineralization fluid, the fourth mineralization fluid, the fifth mineralization fluid and/or the sixth mineralization fluid are diluted in the third beverage conduit 314 and the second beverage conduit 312 such that they do not react in the output manifold 308. Finally, the third mineralization fluid is fed by the third supplementation conduit 320 to the first beverage conduit 314 to avoid that the third mineralization fluid reacts with the first, second, fourth, fifth and/or the sixth mineralization fluid.

In operation the controller 118 controls a plurality of dosing devices 120 to 130 such that the mineralization fluids stored in the mineralization bottles 132 to 142 are not mixed within the mineralization device, i.e. first beverage conduit 314, second beverage conduit 312 and the third beverage conduit 310. If a user requests a beverage to be output, the controller 118 controls a plurality of dosing devices 120 to 130 such that mineralization fluids are fed by the plurality of dosing devices 120 to 130 into the respective beverage conduit 310, 312, 314 simultaneously. It is to be understood that the controller 118 does not have to control all of dosing devices 120 to 130 such to output a mineralization fluid, but actually only the dosing devices 120 to 130 that must deliver a mineralization fluid stored in one of the mineralization vessels 132 to 142 that is required according to a select water recipe. Before a mineralization fluid fed by an upstream outlet of an upstream mineralization conduit is transported by the flow of water in the respective beverage conduits 310, 312, 314 to a downstream outlet of a downstream mineralization conduit, the controller instructs the dosing device connected to the downstream mineralization conduit to stop feeding mineralization fluid through the downstream mineralization conduit and downstream outlet into the respective beverage conduit. Thereby, a mixing of mineralization fluids in the mineralization device 300 can be prevented and thus fall out and other undesired chemical reactions.

Now exemplary and non-limiting scenario is described, in which the first dosing device 120, the third dosing device 124, the fourth dosing device 126 and the fifth dosing device 128 shall feed the respective mineralization fluid into the beverage conduits 310, 312 and 314. As soon as the beverage shall be output by the beverage dispenser 100,' the controller 118 instructs the first dosing device 120, the third dosing device 124, the fourth dosing device 126 and the fifth dosing device 128 to feed mineralization fluid from the respective mineralization vessel 132, one 136, 138, 140 into the respective beverage conduit 310, 312, 314 essentially simultaneously. The mineralization fluid fed by the first dosing device 120, the third dosing device 124, the fourth dosing device 126 and the fifth dosing device 128 is transported downstream in the direction of the outlet 304 of the mineralization device 300.

Before or as soon as mineralization fluid fed by the first mineralization device 120 is transported by the flow of water in the third beverage conduit 310 to the opening 322a of the fourth mineralization conduit 322, the controller 118 instructs the fourth dosing device 126 to stop feeding mineralization fluid from the fourth mineralization bottle 138 into the third beverage conduit 310. Thereby, mixing of the first mineralization fluid and fourth mineralization fluid can be prevented.

Before or as soon as mineralization fluid fed by the third mineralization device 124 is transported by the flow of water in the first and second beverage conduit 312, 314 to the opening 324a of the fifth mineralization conduit 324, the controller 118 instructs the fifth dosing device 128 to stop feeding mineralization fluid from the fifth mineralization bottle 140 into the second beverage conduit 312. Thereby, mixing of the third mineralization fluid and fifth mineralization fluid can be prevented.

Before or as soon as mineralization fluid fed by the fifth mineralization device 120 is transported by the flow of water in the second and third beverage conduit 310, 312 to the opening 316a of the first mineralization conduit 316, the controller 118 instructs the first dosing device 120 to stop feeding mineralization fluid from the first mineralization bottle 132 into the third beverage conduit 310. Thereby, mixing of the first mineralization fluid and fifth mineralization fluid can be prevented.

The present invention allows that mineralization fluids are fed in a rapid manner into a flow of water without reacting with each other, when the mineralization fluids are still solved in a high concentration in the water.

In the second embodiment the beverage conduits 310, 312, 314 are arranged in a meander shape. Other embodiments are possible, such as a beverage conduit in a spiral shape or coil shape.

In one embodiment mineralization fluids that do not react with each other, when in high concentration may mix within a beverage conduit 310. In this embodiment, outlets 316a, 322a and 326a feeding mineralization fluids not reacting with each other are spaced apart a first distance. The outlets 320a, 324a feeding mineralization fluids reacting with each other at high concentration are spaced apart a second distance. The second distance is larger than the first distance. The present invention allows that mineralization fluids (supplementation fluids) not reacting with each other can be fed into a beverage conduit in parallel, whereas mineralization fluids reacting with each other are fed in serial relationship into a beverage conduit.

Under a further aspect of the invention, a first outlet coupled to a first supplementation conduit (mineralization conduit) and second outlet coupled to a second supplementation conduit (mineralization conduit) are space apart such that no diffusion of supplementation fluids (mineralization fluids) from a first outlet to the second outlet during stagnation. Thereby, fall out or other undesired chemical reaction between supplementation fluids (mineralization fluids) the may be avoided.

Figure 3:
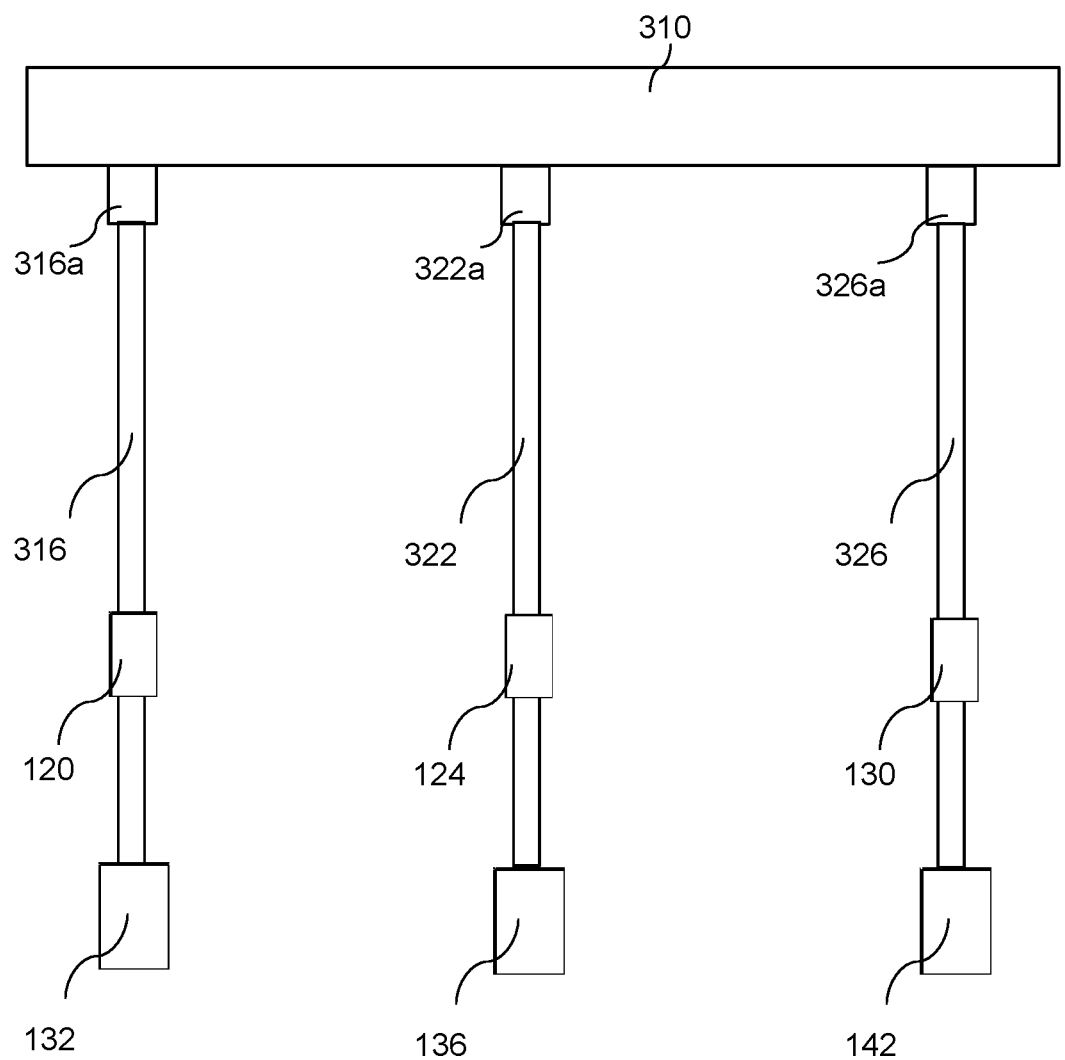
FIG. 3 shows a positional relationship between a beverage conduit and supplementation components.

With reference to FIG. 3 the physical configuration of the beverage dispenser and parts thereof are explained in further detail. FIG. 3 shows the beverage conduit 310 in which water flows from a source to a sink. Particularly below the beverage conduit 310 the outlet opening 316a, 322a, 326a of mineralization conduits 316, 322 and 326 are located. The outlet openings 316a, 322a, 326a of the mineralization conduits 316, 322, 326 may form the inlet openings of the beverage conduit 310 for supplementing minerals or supplementation fluids. Since the inlet openings 316a, 322a, 326a for feeding the mineralization fluids (supplementation fluid) are allocated physically below the beverage conduit 310 diffusion of mineralization fluids (supplementation fluids) into the beverage conduit 310 is prevented. Thereby, fall out of minerals, salts and other undesired chemical reactions of prevented.

In the embodiment shown in FIG. 3 the mineralization conduits (mineralization conduits) 316, 322, 326 are allocated physically below the beverage conduit 310.

The dosing devices 120, 124, 130 allocated below the beverage conduit 210. Further, the mineralization bottles 132, 136 and 142 are arranged physically below the beverage conduits 310.

Thereby, diffusion of mineralization fluids into the beverage conduit 310 during stagnation is prevented. Thereby, also fall out, of minerals and salts as well as undesired chemical reactions are prevented.

The present invention has the advantage that chemical reactions of beverage supplementation fluids with each other can be avoided by feeding the beverage supplementation fluids in parallel relationship into a plurality of parallel beverage streams. The beverage supplementation fluid may also be fed in serial relationship into a water stream for avoiding chemical reactions between the different beverage supplementation fluid.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of supplementing a beverage with a plurality of supplementation fluids in a beverage dispenser, the beverage dispenser comprising:
   at least one beverage conduit including a beverage inlet adapted to be coupled to a beverage source supplying beverage to be supplemented, and a beverage outlet coupled to a beverage sink;
   a first dosing device, wherein an outlet of the first dosing device is connected to an inlet of a first supplementation conduit and an inlet of the first dosing device is connected to a first supplementation source comprising a first supplementation component;
   a second dosing device, wherein an outlet of the second dosing device is connected to an inlet of a second supplementation conduit and an inlet of the second dosing device is connected to a second supplementation source comprising a second supplementation component;

wherein the outlet of the second supplementation conduit is located downstream of the outlet of the first supplementation conduit of the same beverage conduit;

wherein the method comprises the step of controlling the first dosing device and the second dosing device such that the first supplementation component supplied by the first dosing device does not react with the second supplementation component supplied by the second dosing device; and stopping feeding by the second dosing device of the second supplementation component before the first supplementation component fed by the first dosing device into the beverage conduit is transported by the flow of the beverage in the beverage conduit to the outlet of the second supplementation conduit.

2. A beverage dispenser, comprising:

a controller adapted to control a first dosing device and a second dosing device, wherein an outlet of the first dosing device is coupled to an inlet of a first supplementation conduit, wherein an outlet of the second dosing device is coupled to an inlet of a second supplementation conduit and wherein the outlet of the second supplementation conduit is located downstream of the outlet of the first supplementation conduit of a beverage conduit, in which a beverage flows from a beverage source to a beverage sink, wherein the controller controls the first dosing device and the second dosing device such that a first supplementation component supplied by the first dosing device does not react with a second supplementation component supplied by the second dosing device, wherein the controller is adapted to stop feeding the second supplementation component by the second dosing device before the first supplementation component fed by the first dosing device through the outlet of the first supplementation conduit into the beverage conduit is transported by the flow of the beverage in the beverage conduit to the outlet of the second supplementation conduit.

3. A beverage dispenser and/or beverage machine, comprising the beverage supplementation device according to claim 2.

4. The beverage dispenser according to claim 3, wherein the beverage source comprises a water filtration device; and
wherein the beverage sink is at least one of a:
a tube;
a vessel;
a nozzle; and
a disinfection device; and
wherein the inlet of each supplementation conduit is coupled to a different supplementation source, wherein the supplementation source comprises at least one of
a mineralization fluid vessel;
a flavoring agent vessel;
a nutrition supplement vessel.

5. The beverage dispenser according to claim 3, further comprising a plurality of dosing devices, wherein the outlet of each dosing device is connected to the inlet of a supplementation conduit and the inlet of each dosing device is connected to a different supplementation source.

6. The beverage dispenser according to claim 3, further comprising a controller adapted to control at least a first dosing device and a second dosing device, wherein the outlet of the first dosing device is coupled to an inlet of a first supplementation conduit, wherein the outlet of the second dosing device is coupled to an inlet of a second supplementation conduit and wherein the outlet of the second supplementation conduit is located downstream of the outlet of the first supplementation conduit with the same beverage conduit, wherein the controller controls a first dosing device and a second dosing device such that the supplementation fluid supplied by the first dosing device does not react with the supplementation fluid supplied by the second dosing device.

7. The beverage dispenser according to claim 3, wherein a controller is adapted to stop the second dosing device before the supplementation fluid fed by the first dosing device by the outlet of the first supplementation conduit into the beverage conduit is transported by the flow of the beverage in the beverage conduit to the outlet of the second supplementation conduit.

8. The beverage dispenser according to claim 3, wherein
the outlet of at least one supplementation conduit is arranged vertically under the beverage conduit; and/or
the outlet of at least one supplementation conduit and the dosing device are arranged vertically under the beverage conduit; and/or
the outlet of at least one supplementation conduit, the dosing device and the supplementation source are arranged vertically under the beverage conduit.

9. The beverage dispenser according to claim 3, wherein two outlets of supplementation conduits feeding supplementation fluids not-reacting with each other comprise a first distance, and two outlets of supplementation conduits feeding supplementation fluids reacting with each other comprise a second distance, wherein the second distance is larger than the first distance.

10. A beverage supplementation device, adapted to supplement a beverage flowing from a beverage source to a beverage sink with a plurality of supplementation fluids, comprising:

a plurality of beverage conduits, wherein each beverage conduit comprises a beverage inlet that is adapted to be coupled to the same beverage source supplying beverage to be supplemented, and wherein each beverage conduit comprises an outlet; and at least two supplementation conduits, wherein each supplementation conduit has a supplementation inlet adapted to be coupled to a supplementation source providing at least one supplementation fluid, wherein each supplementation conduit is coupled with a different supplementation source and wherein each supplementation conduit comprises an outlet;

wherein the outlet of each supplementation conduit is connected to a different beverage conduit;

wherein the outlets of the beverage conduits are coupled with the same beverage sink, wherein the beverage is water and the supplementation fluid comprises minerals; and a plurality of supplementation conduits, wherein the outlets of a first plurality of supplementation conduits are coupled with the same beverage conduit and the outlets of a second plurality of supplementation conduits are coupled with different beverage conduits.

11. The beverage supplementation device according to claim 10, wherein to at least one beverage conduit a plurality of supplementation outlets of different supplementation conduits are coupled spaced apart from each other to a single beverage conduit.

12. The beverage supplementation device according to claim 10, wherein the beverage inlets of the plurality of beverage conduits are coupled to a single inlet of the beverage supplementation device.

13. The beverage supplementation device according to claim 12, wherein the beverage outlets of the plurality of beverage conduits are coupled to a single outlet of the beverage supplementation device.

\* \* \* \* \*